US011868743B2

(12) United States Patent
Liang et al.

(10) Patent No.: US 11,868,743 B2
(45) Date of Patent: Jan. 9, 2024

(54) METHOD, SYSTEM, AND NON-TRANSITORY COMPUTER-READABLE RECORDING MEDIUM FOR SUPPORTING BLOCK CODING

(71) Applicant: REDBRICK INC., Seoul (KR)

(72) Inventors: Yong Mo Liang, Hwaseong-si (KR); Kwang Yong Lee, Seoul (KR); Sung Ho Yong, Suwon-si (KR)

(73) Assignee: REDBRICK INC., Seoul (KR)

( * ) Notice: Subject to any disclaimer, the term of this patent is extended or adjusted under 35 U.S.C. 154(b) by 163 days.

(21) Appl. No.: 18/046,686

(22) Filed: Oct. 14, 2022

(65) Prior Publication Data

US 2023/0111959 A1    Apr. 13, 2023

Related U.S. Application Data

(63) Continuation of application No. PCT/KR2021/008633, filed on Jul. 7, 2021.

(30) Foreign Application Priority Data

Jul. 24, 2020 (KR) .................. 10-2020-0092629

(51) Int. Cl.
*G06F 9/44* (2018.01)
*G06F 8/34* (2018.01)
*G06F 8/33* (2018.01)

(52) U.S. Cl.
CPC . *G06F 8/34* (2013.01); *G06F 8/33* (2013.01)

(58) Field of Classification Search
None
See application file for complete search history.

(56) References Cited

U.S. PATENT DOCUMENTS

| 7,975,233 | B2* | 7/2011 | Macklem ................. G06F 8/34 |
| | | | 717/109 |
| 8,983,823 | B1* | 3/2015 | Koh ......................... G06F 8/34 |
| | | | 703/22 |
| 9,575,939 | B2* | 2/2017 | Tuschner .............. G06F 40/151 |
| 10,684,830 | B2* | 6/2020 | Mimlitch, III ...... G06F 11/3664 |
| 2016/0092178 | A1* | 3/2016 | Geng ...................... G06F 8/427 |
| | | | 717/104 |
| 2018/0285084 | A1* | 10/2018 | Mimlitch, III ............ G06F 8/33 |

OTHER PUBLICATIONS

Office Action in corresponding Korean Application No. 10-2020-0092629 dated Oct. 29, 2021, 5 pages.

* cited by examiner

*Primary Examiner* — Qing Chen
(74) *Attorney, Agent, or Firm* — Dinsmore & Shohl LLP; Yongsok Choi, Esq.

(57) ABSTRACT

A method for supporting block coding is provided. The method includes the steps of: determining an arrangement position of a coding block selected by a user on the basis of a sentence component-specific arrangement order specified from a sentence structure of a spoken language; and providing the user with an arrangement result of the coding block specified on the basis of the arrangement position.

11 Claims, 9 Drawing Sheets

METHOD, SYSTEM, AND NON-TRANSITORY COMPUTER-READABLE RECORDING MEDIUM FOR SUPPORTING BLOCK CODING

CROSS-REFERENCE TO RELATED APPLICATION(S)

This application is a continuation application of Patent Cooperation Treaty (PCT) International Application No. PCT/KR2021/008633 filed on Jul. 7, 2021, which claims priority to Korean Patent Application No. 10-2020-0092629 filed on Jul. 24, 2020. The entire contents of PCT International Application No. PCT/KR2021/008633 and Korean Patent Application No. 10-2020-0092629 are hereby incorporated by reference.

FIELD OF THE INVENTION

The present invention relates to a method, system, and non-transitory computer-readable recording medium for supporting block coding.

BACKGROUND

Technology related to artificial intelligence, big data, and the like is attracting attention with the advent of the fourth industrial revolution, and more interest is being paid to coding that forms the foundation of such technology.

In order to lower the entry barrier to coding, various coding methods such as block coding, which enables more intuitive coding than text coding, are being developed. However, it takes a long time to learn and practice language structures from scratch, so that most leaners lose interest even from introductory courses in many cases.

In this connection, the inventor(s) present a novel and inventive technique capable of lowering the repulsion and entry barrier to programming languages by supporting block coding based on a sentence component-specific arrangement order specified from a sentence structure of a spoken language.

SUMMARY OF THE INVENTION

One object of the present invention is to solve all the above-described problems in the prior art.

Another object of the invention is to support a person who lacks understanding of coding to easily perform coding by arranging coding blocks in a structure similar to a sentence structure of a spoken language.

Yet another object of the invention is to lower the repulsion and entry barrier to coding by enabling coding based on sentence structures of a spoken language used in daily life.

The representative configurations of the invention to achieve the above objects are described below.

According to one aspect of the invention, there is provided a method for supporting block coding, the method comprising the steps of: determining an arrangement position of a coding block selected by a user on the basis of a sentence component-specific arrangement order specified from a sentence structure of a spoken language; and providing the user with an arrangement result of the coding block specified on the basis of the arrangement position.

According to another aspect of the invention, there is provided a system for supporting block coding, the system comprising: a code block management unit configured to determine an arrangement position of a coding block selected by a user on the basis of a sentence component-specific arrangement order specified from a sentence structure of a spoken language, and to provide the user with an arrangement result of the coding block specified on the basis of the arrangement position.

In addition, there are further provided other methods and systems to implement the invention, as well as non-transitory computer-readable recording media having stored thereon computer programs for executing the methods.

According to the invention, it is possible for a person who lacks understanding of coding to easily perform coding by arranging coding blocks in a structure similar to a sentence structure of a spoken language.

According to the invention, it is possible to lower the repulsion and entry barrier to coding by enabling coding based on sentence structures of a spoken language used in daily life.

DETAILED DESCRIPTION OF THE INVENTION

In the following detailed description of the present invention, references are made to the accompanying drawings that show, by way of illustration, specific embodiments in which the invention may be practiced. These embodiments are described in sufficient detail to enable those skilled in the art to practice the invention. It is to be understood that the various embodiments of the invention, although different from each other, are not necessarily mutually exclusive. For example, specific shapes, structures and characteristics described herein may be implemented as modified from one embodiment to another without departing from the spirit and scope of the invention. Furthermore, it shall be understood that the positions or arrangements of individual elements within each embodiment may also be modified without departing from the spirit and scope of the invention. Therefore, the following detailed description is not to be taken in a limiting sense, and the scope of the invention is to be taken as encompassing the scope of the appended claims and all equivalents thereof. In the drawings, like reference numerals refer to the same or similar elements throughout the several views.

Herein, the term "coding block" may refer to a visual object including at least one operation, function, or program instruction for the convenience of a user who performs coding (specifically, coding by blocks or block coding).

Hereinafter, various preferred embodiments of the present invention will be described in detail with reference to the accompanying drawings to enable those skilled in the art to easily implement the invention.

Configuration of the Entire System

Figure 1:
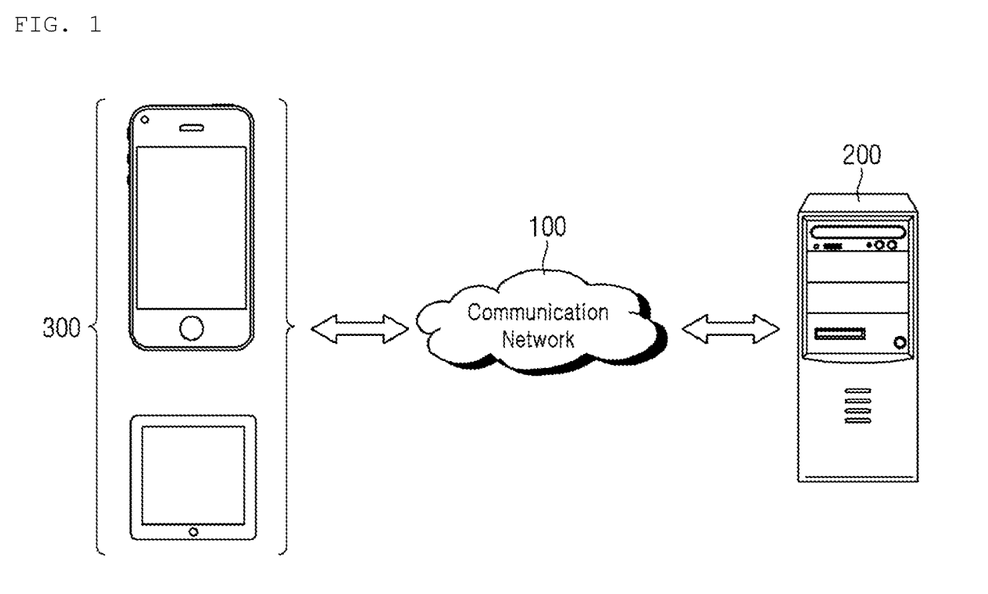
FIG. 1 schematically shows the configuration of an entire system for supporting block coding according to one embodiment of the invention.

FIG. 1 schematically shows the configuration of the entire system for supporting block coding according to one embodiment of the invention.

As shown in FIG. 1, the entire system according to one embodiment of the invention may comprise a communication network 100, a coding support system 200, and a device 300.

First, the communication network 100 according to one embodiment of the invention may be implemented regardless of communication modality such as wired and wireless communications, and may be constructed from a variety of communication networks such as local area networks (LANs), metropolitan area networks (MANs), and wide area networks (WANs). Preferably, the communication network 100 described herein may be the Internet or the World Wide Web (WWW). However, the communication network 100 is not necessarily limited thereto, and may at least partially include known wired/wireless data communication networks, known telephone networks, or known wired/wireless television communication networks.

For example, the communication network 100 may be a wireless data communication network, at least a part of which may be implemented with a conventional communication scheme such as radio frequency (RF) communication, WiFi communication, cellular communication (e.g., Long Term Evolution (LTE) communication), Bluetooth communication (more specifically, Bluetooth Low Energy (BLE) communication), infrared communication, and ultrasonic communication.

Next, the coding support system 200 according to one embodiment of the invention may be a digital device having a memory means and a microprocessor for computing capabilities. The coding support system 200 may be a server system.

According to one embodiment of the invention, the coding support system 200 may function to determine an arrangement position of a coding block selected by a user on the basis of a sentence component-specific arrangement order specified from a sentence structure of a spoken language, and to provide the user with an arrangement result of the coding block specified on the basis of the arrangement position.

According to one embodiment of the invention, the arrangement order may encompass an order of sentence components constituting a sentence of the spoken language, such as an essential component (e.g., a subject, predicate, object, or complement), a subsidiary component (e.g., an adjective or adverb), and an independent component (e.g., an independent word), according to grammar or rules of linguistics (e.g., linguistic typology).

The configuration and functions of the coding support system 200 according to the invention will be discussed in more detail below. Meanwhile, although the coding support system 200 has been described as above, the above description is illustrative, and it will be apparent to those skilled in the art that at least a part of the functions or components required for the coding support system 200 may be implemented or included in an external system (not shown), as necessary.

Next, the device 300 according to one embodiment of the invention is digital equipment that may function to connect to and then communicate with the coding support system 200, and any type of digital equipment having a memory means and a microprocessor for computing capabilities may be adopted as the device 300 according to the invention. The device 300 may be a wearable device such as smart glasses, a smart watch, a smart band, a smart ring, and a smart necklace, or may be a somewhat traditional device such as a smart phone, a smart pad, a desktop computer, a server, a notebook computer, a workstation, a personal digital assistant (PDA), a web pad, and a mobile phone.

In particular, the device 300 according to one embodiment of the invention may include a display means (e.g., a display) for providing a user interface interworking with the coding support system 200.

Meanwhile, the device 300 according to one embodiment of the invention may include an application for performing functions according to the invention. The application may reside in the device 300 in the form of a program module. The characteristics of the program module may be generally similar to those of a code block management unit 210, a code execution management unit 220, a communication unit 230, and a control unit 240 of the coding support system 200 to be described below. Here, at least a part of the application may be replaced with a hardware device or a firmware device that may perform a substantially equal or equivalent function, as necessary.

Configuration of the Coding Support System

Hereinafter, the internal configuration of the coding support system 200 crucial for implementing the invention and the functions of the respective components thereof will be discussed.

Figure 2:
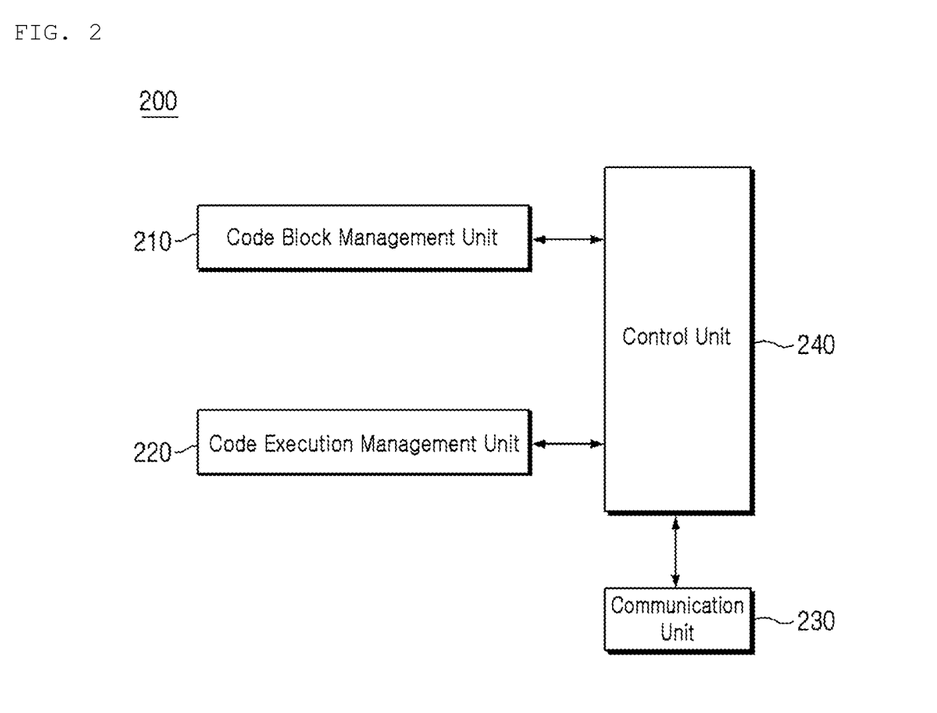
FIG. 2 specifically shows the internal configuration of a coding support system according to one embodiment of the invention.

FIG. 2 specifically shows the internal configuration of the coding support system 200 according to one embodiment of the invention.

As shown in FIG. 2, the coding support system 200 according to one embodiment of the invention may comprise a code block management unit 210, a code execution management unit 220, a communication unit 230, and a control unit 240. According to one embodiment of the invention, at least some of the code block management unit 210 (which may comprise an arrangement position determination unit 211 and an arrangement result provision unit 212), the code execution management unit 220, the communication unit 230, and the control unit 240 may be program modules that communicate with an external system. The program modules may be included in the coding support system 200 in the form of operating systems, application program modules, and other program modules, while they may be physically stored in a variety of commonly known storage devices. Further, the program modules may also be stored in a remote storage device that may communicate with the coding support system 200. Meanwhile, such program modules may include, but are not limited to, routines, subroutines, programs, objects, components, and data structures for performing specific tasks or executing specific abstract data types according to the invention as will be described below.

First, the arrangement position determination unit 211 of the code block management unit 210 according to one embodiment of the invention may function to determine an arrangement position of a coding block selected by a user on the basis of a sentence component-specific arrangement order specified from a sentence structure of a spoken language.

For example, when first to third coding blocks respectively corresponding to a subject, a predicate, and an object are selected by the user, the arrangement position determination unit 211 may determine the arrangement positions of the coding blocks such that the coding blocks are arranged in the order of the first coding block corresponding to the subject, the third coding block corresponding to the object, and the second coding block corresponding to the predicate, on the basis of a sentence component-specific arrangement order specified from a sentence structure of the Korean language.

As another example, when fourth to sixth coding blocks respectively corresponding to a subject, a predicate, and an object are selected by the user, the arrangement position determination unit 211 may determine the arrangement positions of the coding blocks such that the coding blocks are arranged in the order of the fourth coding block corresponding to the subject, the fifth coding block corresponding to the predicate, and the sixth coding block corresponding to the object, on the basis of a sentence component-specific arrangement order specified from a sentence structure of the English language.

Further, the arrangement position determination unit 211 may determine a type of spoken language (e.g., Korean or English) for specifying the arrangement order with reference to context information associated with the user.

For example, the arrangement position determination unit 211 may determine the type of spoken language for specifying the arrangement order with reference to at least one of a type of spoken language estimated to be used by the user and a type of written language estimated to be used by the user.

More specifically, when it is determined that the user utters the Korean language at or above a predetermined level of frequency for a predetermined period, the arrangement position determination unit 211 may determine the Korean language as the spoken language for specifying the arrangement order.

In addition, the arrangement position determination unit 211 may determine the arrangement positions of the coding blocks such that the coding blocks are arranged in a structure corresponding to a sentence structure of the spoken language in a predetermined area among areas displayed to the user.

Figure 3A:
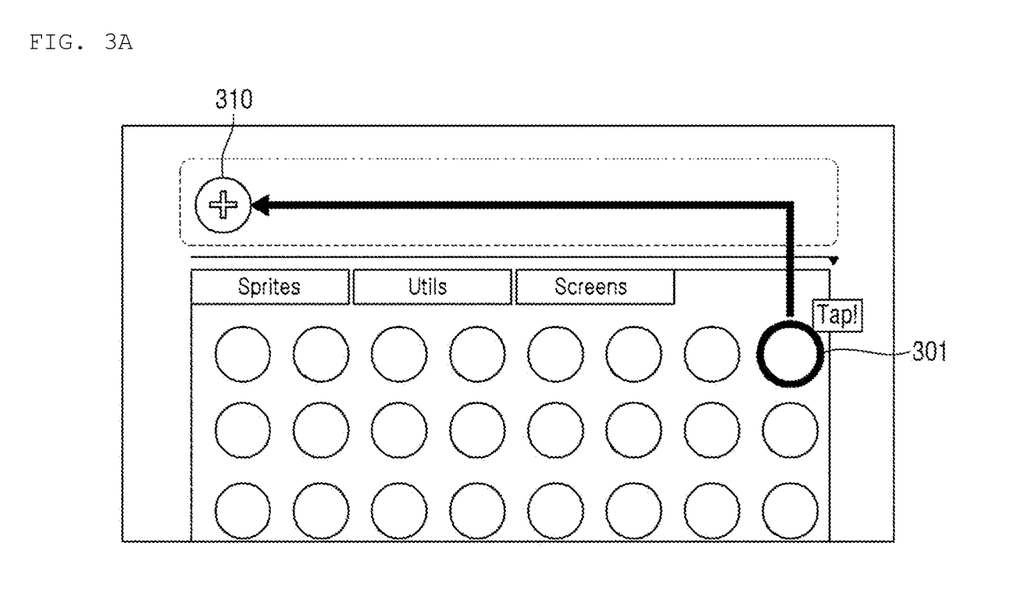
FIGS. 3A and 3B illustratively show how to support block coding according to one embodiment of the invention.
Figure 3B:
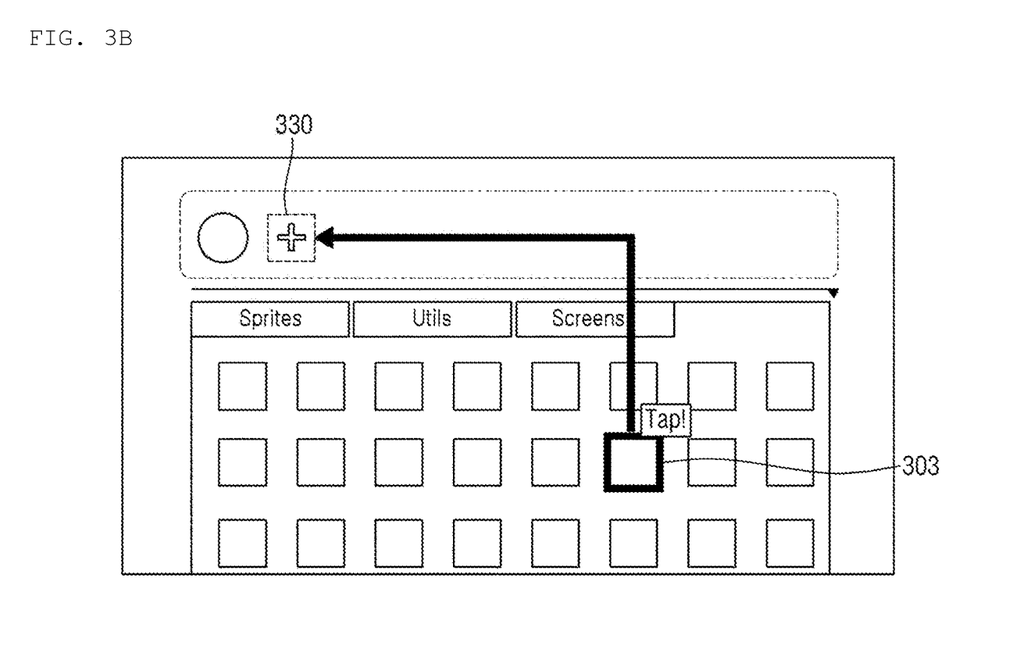

For example, referring to FIGS. 3A and 3B, the arrangement position determination unit 211 may determine the arrangement positions in the area displayed to the user such that coding blocks 301 and 303 selected by the user are arranged in positions 310 and 330 matching with a sentence component-specific arrangement order specified from a sentence structure of the spoken language, with reference to sentence components of the coding blocks 301 and 303 selected by the user.

Moreover, the arrangement position determination unit 211 may refer to a first sentence component corresponding to a first coding block that is previously arranged to determine a second sentence component that may be arranged after the first sentence component, and may recommend the user at least one second coding block corresponding to the determined second sentence component. Sentence components according to one embodiment of the invention refer to elements that are distinguished by function, role, or the like in a sentence. For example, the sentence components may be divided into an essential component, a subsidiary component, and an independent component that are linguistically distinguished, and may be more specifically divided into a subject, a predicate, an object, a complement, an adjective, an adverb, and an independent word. However, it is noted that the types of sentence components according to the invention are not necessarily limited to those listed above (or linguistic elements), and may be changed to component elements or the like according to various or arbitrary criteria as long as the objects of the invention may be achieved.

For example, when the first sentence component corresponding to the previously arranged first coding block is a subject, the arrangement position determination unit 211 may determine a predicate that may be arranged after the first sentence component (i.e., subject) as the second sentence component, and may recommend the user at least one second coding block corresponding to the determined second sentence component (i.e., predicate).

More specifically, a plurality of coding blocks respectively corresponding to a subject, a predicate, and an object are displayed to the user, and the arrangement position determination unit 211 may cause the at least one recommended second coding block, among the plurality of displayed coding blocks, to be displayed in a manner visually different from the other coding blocks. That is, only the at least one second coding block may be displayed in a different color or given an effect in order to induce the user to select only one coding block from among the at least one second coding block without selecting the other coding blocks.

Further, the arrangement result provision unit 212 of the code block management unit 210 according to one embodiment of the invention may function to provide the user with an arrangement result of the coding block specified on the basis of the arrangement position determined by the arrangement position determination unit 211.

For example, a plurality of coding blocks specified on the basis of arrangement positions determined by the arrangement position determination unit 211 may be visualized in a structure corresponding to a sentence structure of the spoken language, and the arrangement result provision unit 212 may provide the user with a visualized arrangement result of the plurality of coding blocks.

Figure 4:
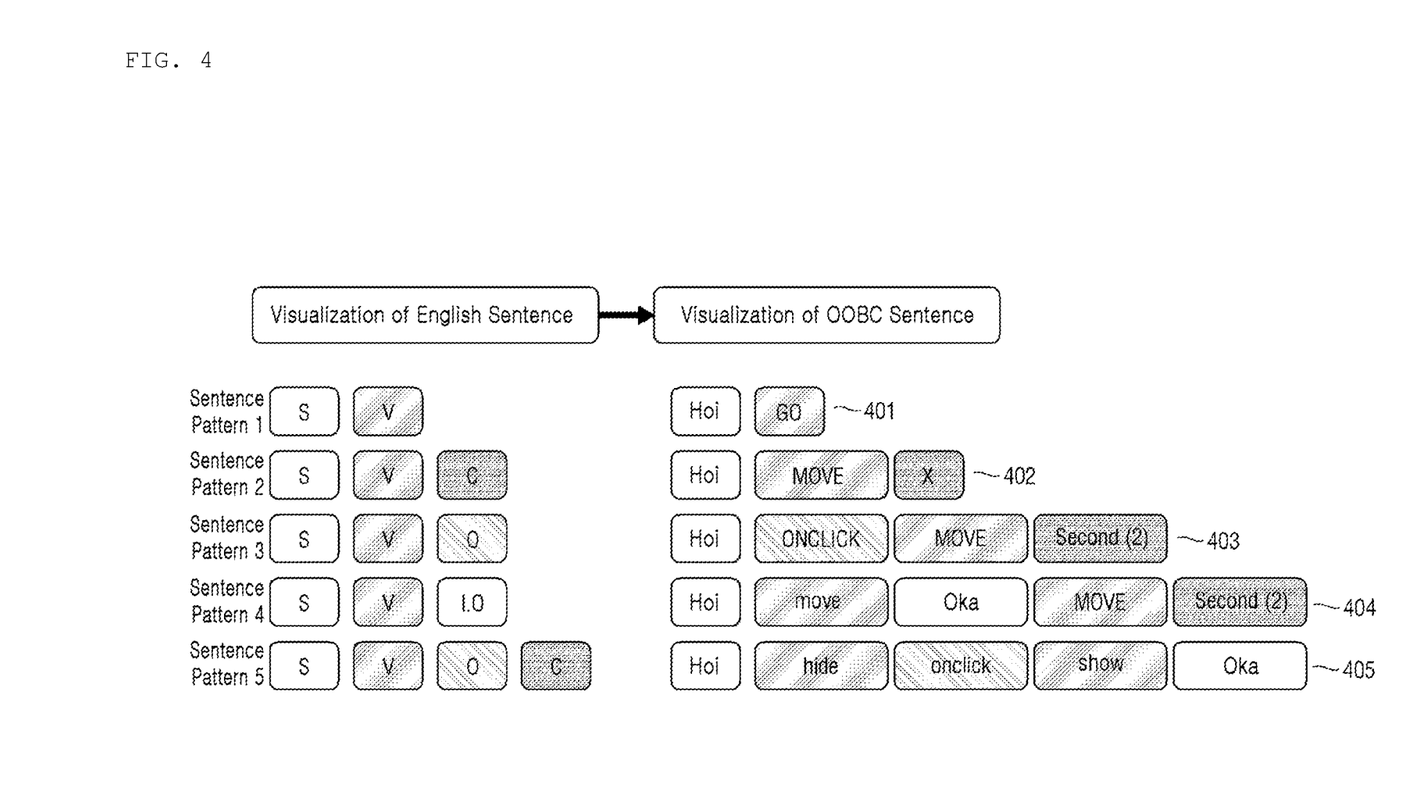
FIG. 4 illustratively shows how to support block coding according to one embodiment of the invention.

More specifically, referring to FIG. 4, the arrangement result provision unit 212 may display arrangement results 401, 402, 403, 404 and 405 of a plurality of coding blocks, which are visualized in structures corresponding to sentence structures (i.e., first to fifth sentence patterns) of the English language, to the user.

Meanwhile, when a correction is requested for at least one coding block, the arrangement result provision unit 212 may rearrange the coding blocks to reflect the correction request, and provide the user with an arrangement result of the rearranged coding blocks.

Figure 5A:
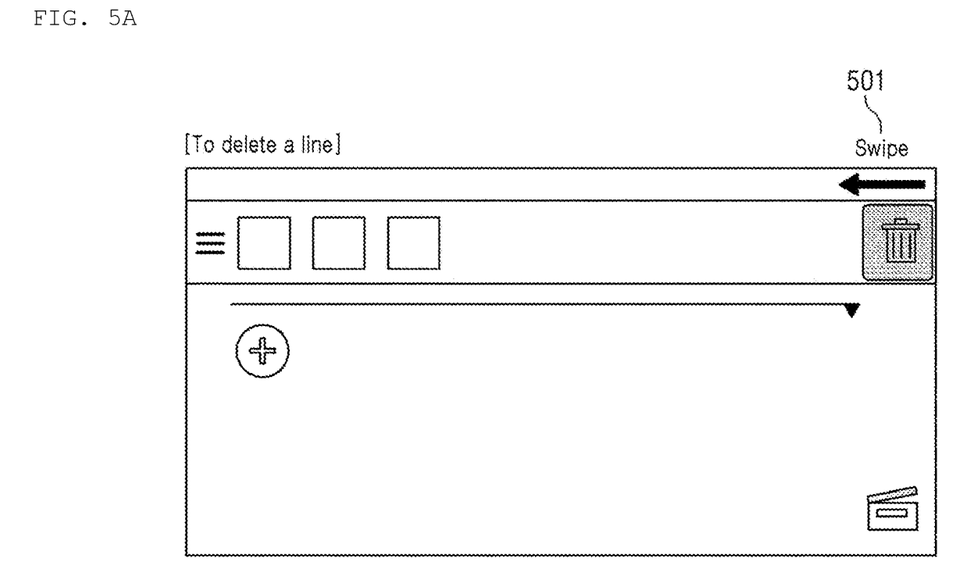
FIGS. 5A and 5B illustratively show how to support block coding according to one embodiment of the invention.

For example, when a deletion is requested for a sentence or line composed of at least one coding block (e.g., referring to FIG. 5A, a deletion button is activated as a swipe 501 is made on a specific line, and a deletion of the line may be requested when the deletion button is selected by the user), the arrangement result provision unit 212 may delete the sentence or line and provide the user with an arrangement result of the rearranged coding blocks.

Figure 5B:
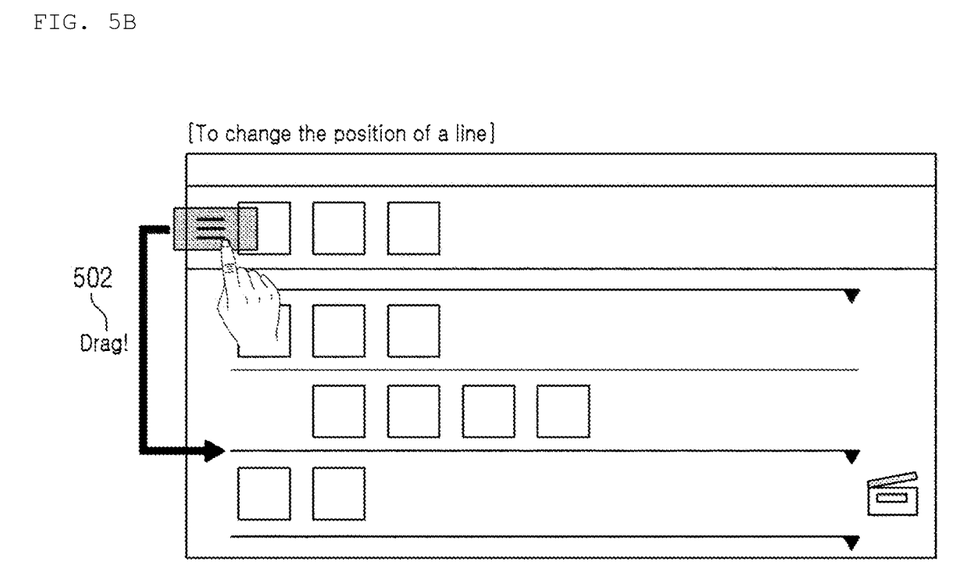

As another example, when a position change is requested for a sentence or line composed of at least one coding block (e.g., referring to FIG. 5B, a position change of a specific line may be requested as a drag 502 is made on the line), the arrangement result provision unit 212 may adjust the position of the sentence or line and provide the user with an arrangement result of the rearranged coding blocks.

Figure 6A:
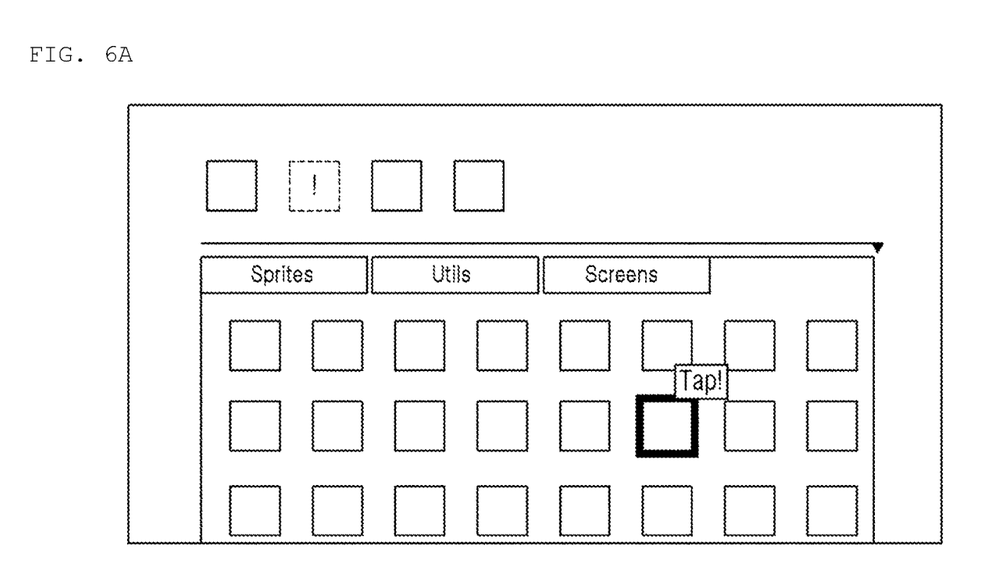
FIGS. 6A and 6B illustratively show how to support block coding according to one embodiment of the invention.
Figure 6B:
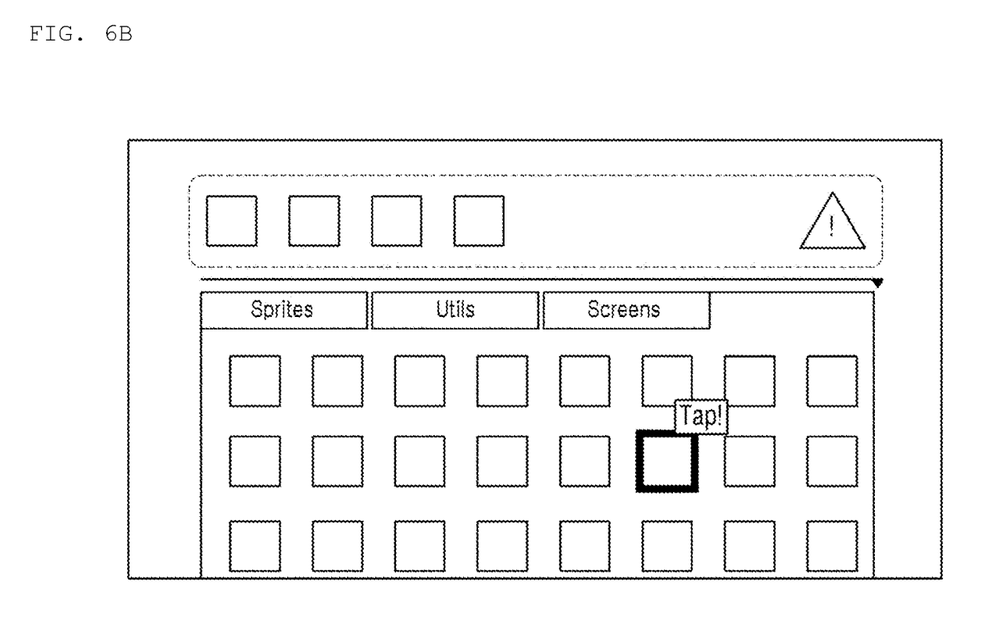

Meanwhile, the arrangement result provision unit 212 may refer to the arrangement result of the plurality of coding blocks (e.g., the result of rearranging the coding blocks to reflect the correction request) and provide the user with a notification message (e.g., a warning message) when the arrangement result does not match with the sentence component-specific arrangement order specified from the sentence structure of the spoken language, or when a coding block corresponding to a certain sentence component, among the sentence components specified from the sentence structure of the spoken language, is omitted or excessively included (see FIGS. 6A and 6B).

Next, the code execution management unit 220 may function to generate programming codes with reference to the arrangement result of the plurality of coding blocks.

For example, the code execution management unit 220 may generate programming codes corresponding to the arrangement result of the plurality of coding blocks, with reference to a correspondence relationship between a sentence structure of the spoken language and a sentence structure of the programming code language (wherein the correspondence relationship may be predetermined).

Further, the code execution management unit 220 may provide the user with a scenario determined on the basis of the arrangement result of the plurality of coding blocks.

For example, the code execution management unit 220 may generate programming codes according to the arrangement result of the plurality of coding blocks, and provide the user with a video scenario operated according to the programming codes.

As another example, the code execution management unit 220 may perform compilation on the basis of the arrangement result of the plurality of coding blocks, and provide the user with an audio scenario operated according to a result of the compilation.

Next, the communication unit 230 according to one embodiment of the invention may function to enable data transmission/reception from/to the code block management unit 210 and the code execution management unit 220.

Lastly, the control unit 240 according to one embodiment of the invention may function to control data flow among the code block management unit 210, the code execution management unit 220, and the communication unit 230. That is, the control unit 240 according to the invention may control data flow into/out of the coding support system 200 or data flow among the respective components of the coding support system 200, such that the code block management unit 210, the code execution management unit 220, and the communication unit 230 may carry out their particular functions, respectively.

Hereinafter, the overall process of block coding according to the invention will be described with examples.

Figure 7:
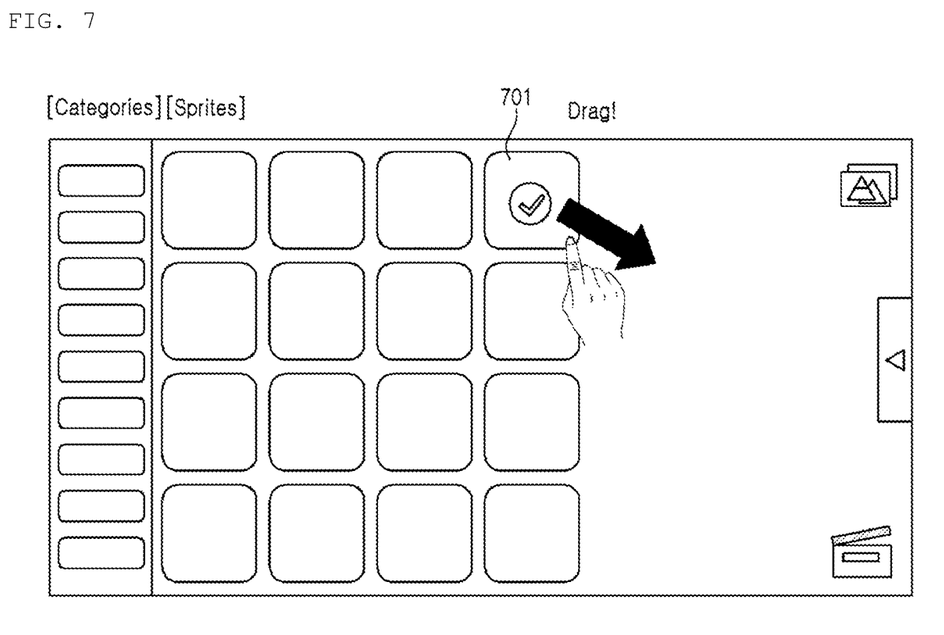
FIG. 7 illustratively shows how to support block coding according to one embodiment of the invention.
Figure 8:
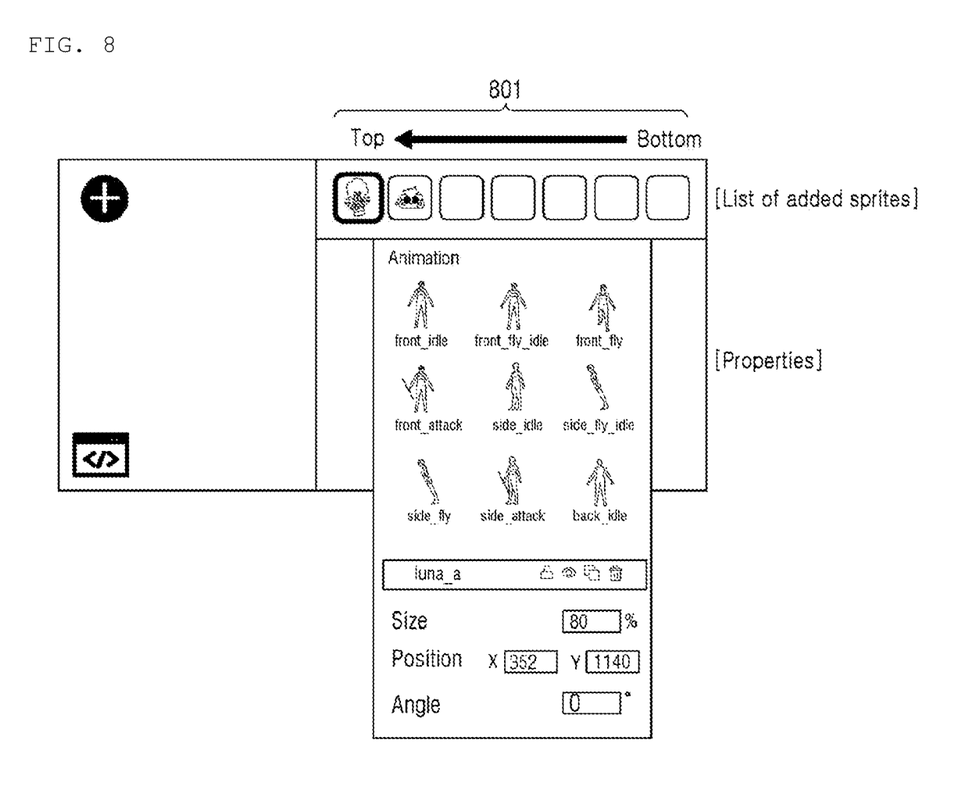
FIG. 8 illustratively shows how to support block coding according to one embodiment of the invention.
Figure 9:
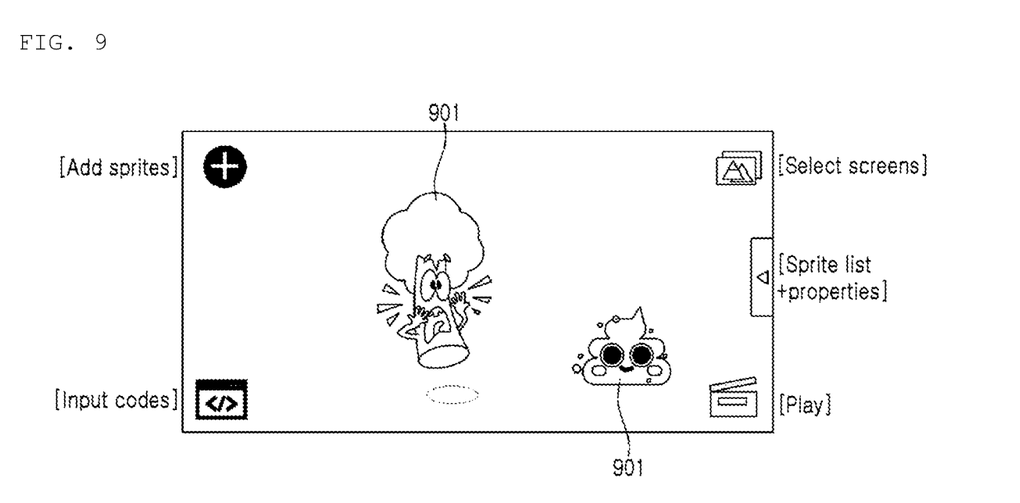
FIG. 9 illustratively shows how to support block coding according to one embodiment of the invention.
Figure 10:
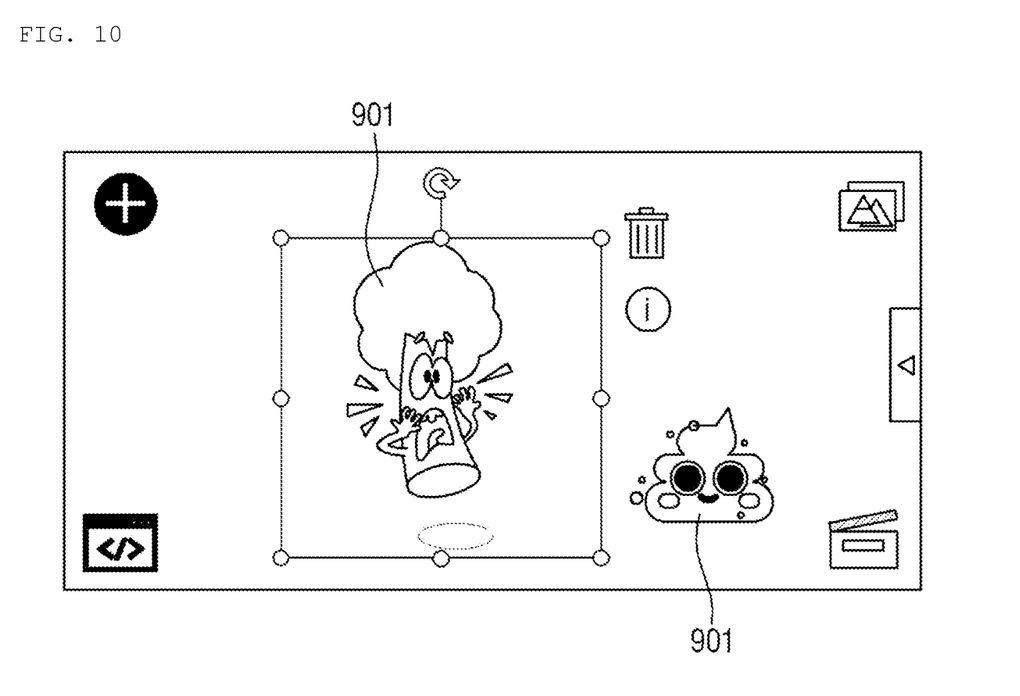
FIG. 10 illustratively shows how to support block coding according to one embodiment of the invention.

First, referring to FIGS. 7 and 8, according to one embodiment of the invention, at least one target object selected (or dragged) by a user from among a plurality of target objects may be specified as a target object 701 or 801 for which coding is to be applied. According to one embodiment of the invention, a target object 901 specified as above may be arranged in a predetermined area of a screen displayed to the user (see FIG. 9). Further, according to one embodiment of the invention, an interface for changing the size or arrangement position of the target object 901 may be further provided (see FIG. 10).

Figure 11:
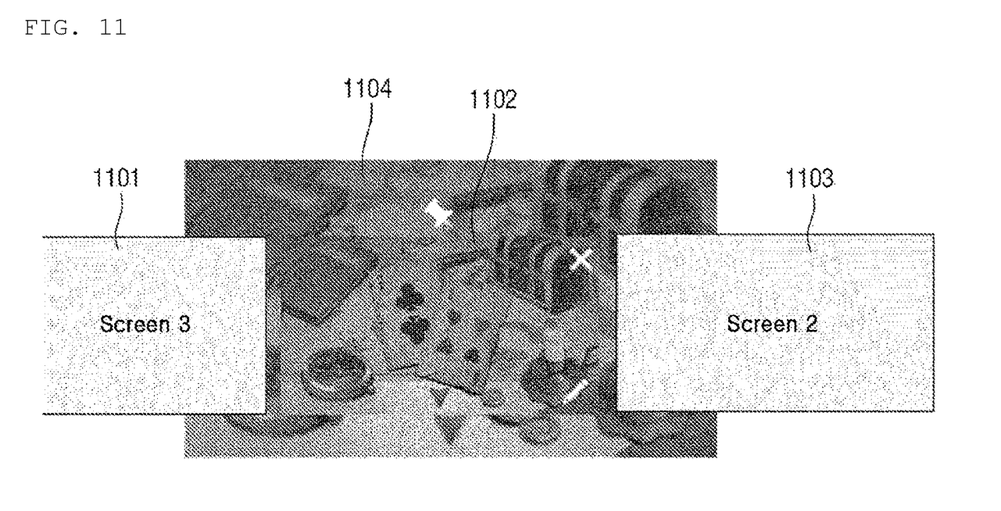
FIG. 11 illustratively shows how to support block coding according to one embodiment of the invention.

Next, referring to FIG. 11, an interface for selecting a background screen where the specified target object is to be arranged may be provided.

For example, a plurality of cards 1101, 1102 and 1103 including background screens (or screen images) are displayed and a background screen included in the card 1102 selected by a swipe may be displayed as blurred in a background 1104 of the card.

Next, a first coding block corresponding to a first sentence component (i.e., subject) may be selected by the user (e.g., an image of the subject that is the first sentence component may be visually displayed on the first coding block). In this case, an arrangement position of the first coding block selected by the user may be determined on the basis of a sentence component-specific arrangement order specified from a sentence structure of a spoken language.

Next, with reference to the first sentence component (i.e., subject) corresponding to the previously arranged first coding block, a second sentence component (i.e., predicate) that may be arranged after the first sentence component may be determined, and at least one second coding block corresponding to the determined second sentence component (i.e., predicate) may be recommended to the user.

Next, a second coding block corresponding to the second sentence component (i.e., predicate) may be selected by the user (e.g., a text of the predicate that is the second sentence component may be visually displayed on the second coding block). In this case, an arrangement position of the second coding block selected by the user may be determined on the basis of the sentence component-specific arrangement order specified from the sentence structure of the spoken language.

Next, with reference to the second sentence component (i.e., predicate) corresponding to the previously arranged second coding block, a third sentence component (i.e., object) that may be arranged after the second sentence component may be determined, and at least one third coding block corresponding to the determined third sentence component (i.e., object) may be recommended to the user.

Next, a third coding block corresponding to the third sentence component (i.e., object) may be selected by the user (e.g., a text of the object that is the third sentence component may be visually displayed on the third coding block). In this case, an arrangement position of the third coding block selected by the user may be determined on the basis of the sentence component-specific arrangement order specified from the sentence structure of the spoken language.

Next, the user may be provided with a video scenario determined on the basis of an arrangement result of the plurality of coding blocks arranged as above (i.e., the first coding block, the second coding block, and the third coding block).

The embodiments according to the invention as described above may be implemented in the form of program instructions that can be executed by various computer components, and may be stored on a computer-readable recording medium. The computer-readable recording medium may include program instructions, data files, and data structures, separately or in combination. The program instructions stored on the computer-readable recording medium may be specially designed and configured for the present invention, or may also be known and available to those skilled in the computer software field. Examples of the computer-readable recording medium include the following: magnetic media such as hard disks, floppy disks and magnetic tapes; optical media such as compact disk-read only memory (CD-ROM) and digital versatile disks (DVDs); magneto-optical media such as floptical disks; and hardware devices such as read-only memory (ROM), random access memory (RAM) and flash memory, which are specially configured to store and execute program instructions. Examples of the program instructions include not only machine language codes created by a compiler, but also high-level language codes that can be executed by a computer using an interpreter. The above hardware devices may be changed to one or more software modules to perform the processes of the present invention, and vice versa.

Although the present invention has been described above in terms of specific items such as detailed elements as well as the limited embodiments and the drawings, they are only provided to help more general understanding of the invention, and the present invention is not limited to the above embodiments. It will be appreciated by those skilled in the art to which the present invention pertains that various modifications and changes may be made from the above description.

Therefore, the spirit of the present invention shall not be limited to the above-described embodiments, and the entire scope of the appended claims and their equivalents will fall within the scope and spirit of the invention.

What is claimed is:

1. A method for supporting block coding, the method comprising steps of:
   determining, by a processor, an arrangement position of a coding block selected by a user on a basis of a sentence component-specific arrangement order specified from a sentence structure of a spoken language, wherein determining the arrangement position of the coding block selected by the user comprises:
   determining, with reference to a first sentence component corresponding to a first coding block that is previously arranged, a second sentence component capable of being arranged after the first sentence component; and
   recommending the user at least one second coding block corresponding to the determined second sentence component; and
   providing, by the processor, the user with an arrangement result of the coding block specified on the basis of the arrangement position, wherein the providing the user with the arrangement result of the coding block comprises a plurality of coding blocks are visualized in a structure corresponding to the sentence structure of the spoken language,
   wherein a sentence component includes at least one of an essential component, a subsidiary component, and an independent component in a sentence of the spoken language, and the arrangement order is determined on the basis of an order of the sentence component according to grammar or rules of linguistics.

2. The method of claim 1, wherein the at least one recommended second coding block is displayed in a manner visually different from other coding blocks.

3. The method of claim 1, wherein in the determining step, the arrangement position of the coding block is determined such that the coding block is arranged in a structure corresponding to the sentence structure of the spoken language in a predetermined area among areas displayed to the user.

4. The method of claim 1, wherein the providing step comprises the step of generating programming codes corresponding to the coding block with reference to the arrangement result of the coding block.

5. The method of claim 4, wherein the providing step further comprises the step of providing the user with a scenario determined on the basis of the generated programming codes.

6. A non-transitory computer-readable recording medium having stored thereon a computer program for executing the method of claim 1.

7. A system for supporting block coding, the system comprising a non-transitory computer-readable medium stored a code block management unit executed by a processor to:
   determine an arrangement position of a coding block selected by a user on the basis of a sentence component-specific arrangement order specified from a sentence structure of a spoken language, wherein determine the arrangement position of the coding block selected by the user comprises:
   determine, with reference to a first sentence component corresponding to a first coding block that is previously arranged, a second sentence component capable of being arranged after the first sentence component, and
   recommend the user at least one second coding block corresponding to the determined second sentence component, and
   provide the user with an arrangement result of the coding block specified on the basis of the arrangement position, wherein provide the user with an arrangement result of the coding block comprises a plurality of coding blocks are visualized in a structure corresponding to the sentence structure of the spoken language,
   wherein a sentence component includes at least one of an essential component, a subsidiary component, and an independent component in a sentence of the spoken language, and the arrangement order is determined on the basis of an order of the sentence component according to grammar or rules of linguistics.

8. The system of claim 7, wherein the at least one recommended second coding block is displayed in a manner visually different from other coding blocks.

9. The system of claim 7, wherein the arrangement position of the coding block is determined such that the coding block is arranged in a structure corresponding to the sentence structure of the spoken language in a predetermined area among areas displayed to the user.

10. The system of claim 7, further comprising a code execution management unit executed by the processor to provide the user with a scenario determined on the basis of the arrangement result of a plurality of coding blocks.

11. The system of claim 7, further comprising a code execution management unit executed by the processor to generate programming codes with reference to the arrangement result of a plurality of coding blocks.

* * * * *